United States Patent [19]
Stroud

[11] Patent Number: 5,427,331
[45] Date of Patent: Jun. 27, 1995

[54] RAPID DEFLATION SYSTEM FOR PNEUMATIC SEAT CUSHION

[75] Inventor: Ronald L. Stroud, Benbrook, Tex.

[73] Assignee: Lockheed Corporation, Fort Worth, Tex.

[21] Appl. No.: 221,854

[22] Filed: Apr. 1, 1994

[51] Int. Cl.$^6$ .......................................... B64D 25/115
[52] U.S. Cl. ........................ 244/122 AG; 244/122 A; 297/216.1
[58] Field of Search ........ 244/122 R, 122 A, 122 AE, 244/122 AG; 297/284.1, 216.1, 216.17

[56] References Cited

U.S. PATENT DOCUMENTS

| | | | |
|---|---|---|---|
| 2,981,317 | 4/1961 | Cartwright, Jr. et al. | 244/122 R |
| 3,192,540 | 7/1965 | Swank | 244/122 R |
| 3,192,541 | 7/1965 | Moore | 244/122 R |
| 3,966,146 | 6/1976 | Roberts | 244/122 A |
| 4,634,083 | 1/1987 | McKinnon | 244/122 R |
| 4,834,322 | 5/1989 | Wurst | 244/122 AG |

FOREIGN PATENT DOCUMENTS

| | | | |
|---|---|---|---|
| 2250327 | 5/1975 | France | 297/216.1 |
| 941072 | 11/1963 | United Kingdom | 244/122 R |

*Primary Examiner*—William Grant
*Attorney, Agent, or Firm*—Arthur F. Zobal

[57] ABSTRACT

Seat structure is provided for supporting a person. An inflatable cushion is coupled to the seat structure in a position for bearing at least a part of the force exerted by the person when supported by the seat structure. A source of gas under pressure is provided for inflating the cushion. A control arrangement including a pressure sensor and a valve is coupled to the cushion and to the source for maintaining the pressure of the gas in the cushion at a given level. Also provided is a pressure release mechanism including an outlet and an outlet valve independent of the control arrangement for deflating the cushion to allow the force exerted by the person supported by the seat structure, when high acceleration forces are encountered, to be born primarily by the seat structure. In one embodiment, the pressure release mechanism is a flexible strap for compressing the cushion when the outlet valve is opened for increasing the rate of deflation. In other embodiments an ejector and a vacuum container are employed for increasing the rate of deflation. A primer cord also may be employed for rupturing the cushion when actuated.

7 Claims, 13 Drawing Sheets

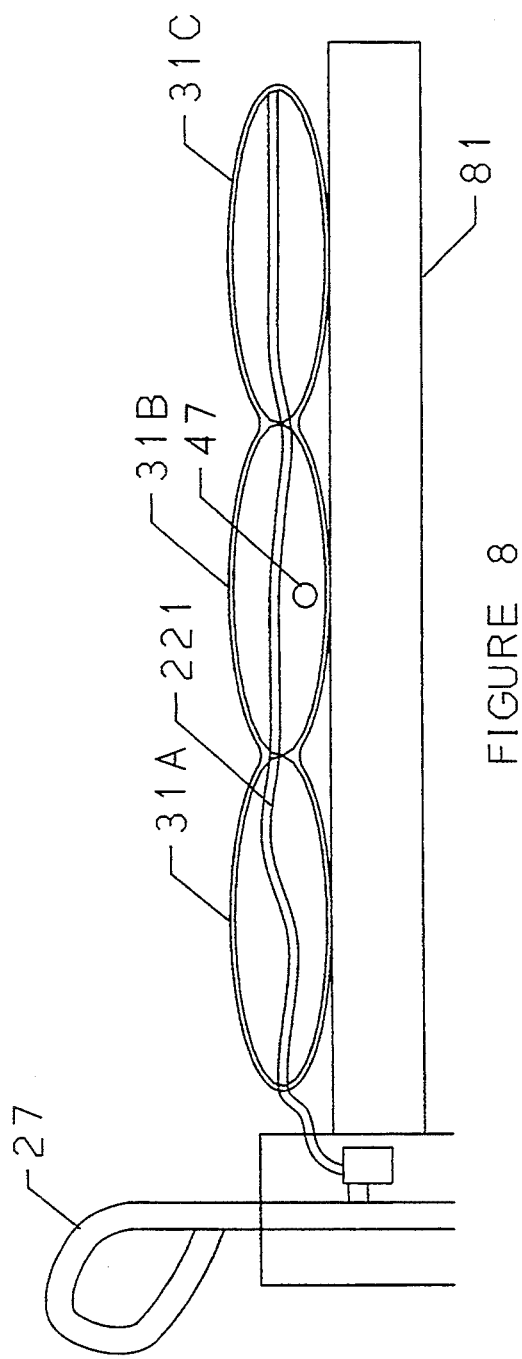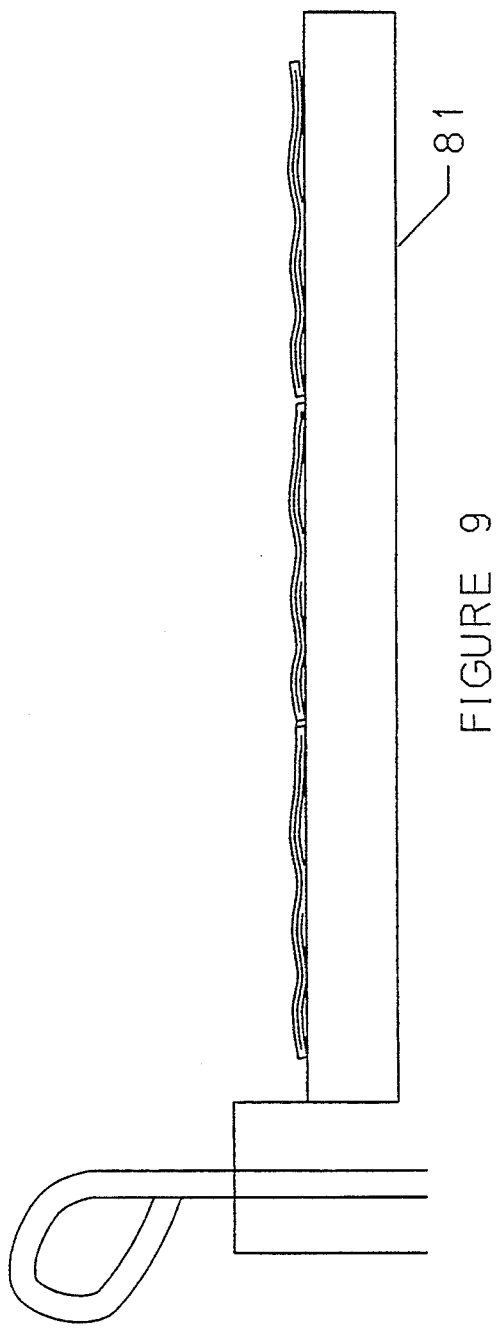

RAPID DEFLATION SYSTEM FOR PNEUMATIC SEAT CUSHION

BACKGROUND OF THE INVENTION

1. Field of the Invention.

The invention relate to a rapid deflation system for a pneumatic seat cushion useful in aircraft.

2. Description of the Prior Art

The seats of many tactical aircraft are uncomfortable to the pilots or crewmembers even for short missions. Because of the firmness of the cushions used in the present seating systems, there is a considerable, sometimes partially debilitating amount of discomfort experienced by those persons required to use the seats. The discomfort grows with time and with the manner in which the seat is used. For example, if the seat is in a maneuvering aircraft, the user feels higher pressures on the body/seat contact points during so called "positive 'g'" maneuvers that can result in greater discomfort. A cushion that is less firm would decrease the discomfort, but at the greater risk of serious injury during ejection.

For an ejection-seat-equipped aircraft, the risk of sitting on a soft cushion is enormous. During an ejection sequence while sitting on the very firm standard issue seat cushion, the crewmember and seat accelerate out of the aircraft as one. That acceleration is carefully tailored to generate the maximum force that a pilot can reasonably tolerate. If that crewmember were to add a soft cushion between himself and the seat, the stage is set for disaster. Should an ejection sequence be initiated while on the soft cushion, the crewmember would at first remain stationary while the seat accelerated and the cushion compressed. Eventually the now fast moving seat would come crashing into the crewmember's posterior with great force likely causing serious spinal injury. Present seating systems avoid that impact by making the cushions so thin and firm that the occupant accelerates practically as one with the seat.

SUMMARY OF THE INVENTION

In order to eradicate the problems associated with present seating systems, it is an object of the invention to employ a pneumatic cushion whose inflation pressure is varied to suit the comfort and safety needs of the occupant. In accordance with one aspect of the invention, during normal operation, the differential between the seat cushion inflation pressure and the ambient pressure of the confines in which the seat is installed, is maintained at a value specified to maximize the comfort and efficiency of the occupant. During times of increased acceleration associated with maneuvering flight, that specified differential may be increased as required to maintain the same location of the occupant relative to his local environment. That is an important point in that it keeps the pilot in the best position to see his instruments and reach his controls. That increase in pressure difference may also serve to prevent the compression of the cushion and contact of the occupant's body with the hard surface of the seat thus avoiding discomfort. This function is similar to the operation of the so called "G-suits" worn by many military pilots. During the ejection sequence, the cushion is caused to rapidly deflate to allow the occupant's body to come in close contact with the hard surface of the seat. That contact, occurring before the seat starts moving, will allow safe transmittal of the ejection acceleration to the occupant's body.

Thus the invention increases the comfort of personnel required to sit or recline for relatively long periods of time in ejection seats or capsules, and provides a safe seating surface for ejection.

In accordance with the invention, there is provided a seat for supporting a person in a vehicle subject to high acceleration forces comprising seat structure for supporting a person; an inflatable cushion coupled to said seat structure in a position for bearing at least a part of the force exerted by the person when supported by said seat structure; a source of gas under pressure for inflating said cushion; control means including pressure sensing means and valve means coupled to said cushion and to said source for maintaining the pressure of the gas in said cushion generally at a given level; and pressure release means independent of said control means for rapidly deflating said cushion to allow the force exerted by the person supported by said seat structure, when high acceleration forces are encountered, to be born primarily by said seat structure.

In accordance with a further aspect of the invention, said pressure release means comprises an outlet coupled to said cushion, a pressure release valve coupled to said outlet for releasing the gas pressure in said cushion when opened, and apparatus for opening said pressure release valve.

In a further aspect, there is provided mechanical compression means for compressing said cushion when said pressure release valve is opened, and means for actuating said compression means when said pressure release valve is opened for compressing said cushion for increasing the rate at which the gas pressure in said cushion is released.

In the embodiment disclosed, the mechanical compression means comprises a flexible strap which compresses said cushion when said pressure release valve is opened.

BRIEF DESCRIPTION OF THE DRAWINGS

In FIG. 3, the cushion is inflated.

FIG. 8-10 illustrate a primer cord routed around the inside of the cushion to explosively rupture the cushion when actuated.

DESCRIPTION OF THE PREFERRED EMBODIMENT

Figure 1A:
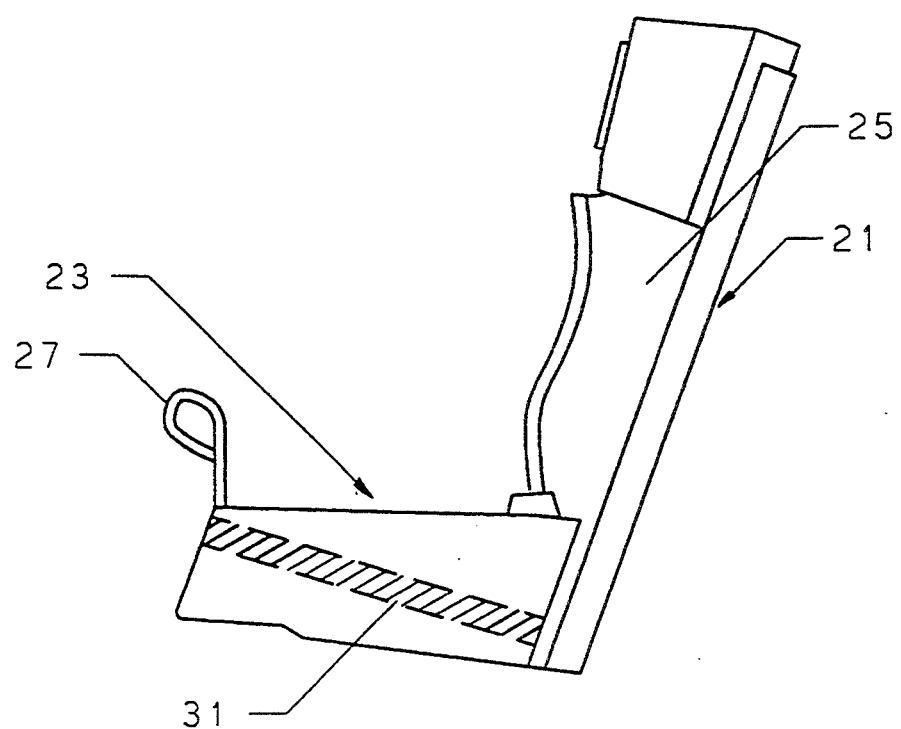
FIGS. 1A and 1B illustrate the general location of the cushion of the invention in a typical ejection seat.
Figure 1B:
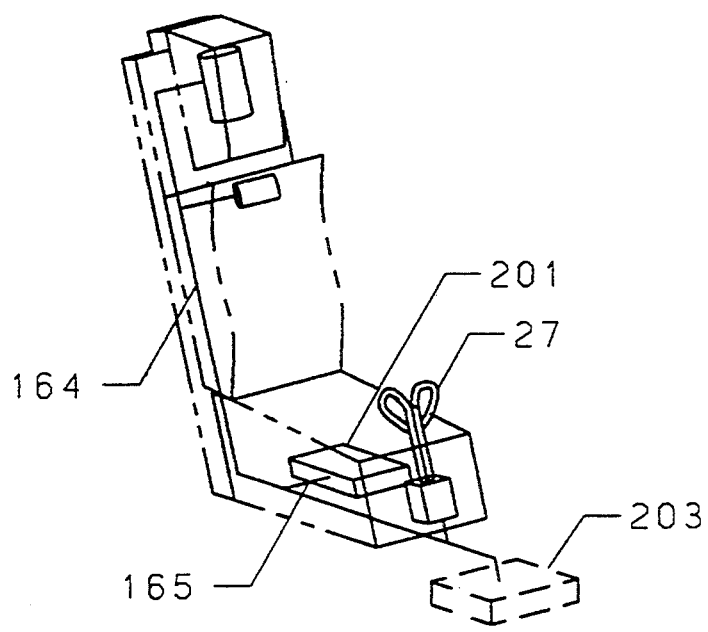

Referring now to FIGS. 1A and 1B, there is illustrated an ejection seat 21 typically used in aircraft. It comprises a bottom portion 23 on which a person sits and a back portion 25 for supporting the person's back. A manually actuated ejection handle is shown at 27 which is actuated by the person setting on the seat for causing the generation of hot gases under pressure by the ejection system depicted at 203 for ejection of the seat from the aircraft. The handle 27 may be located at different positions than that shown. The ejection seat and system for ejecting the seat may be of the type manufactured by McDonnell-Douglas and identified as ACES II.

Figure 5:
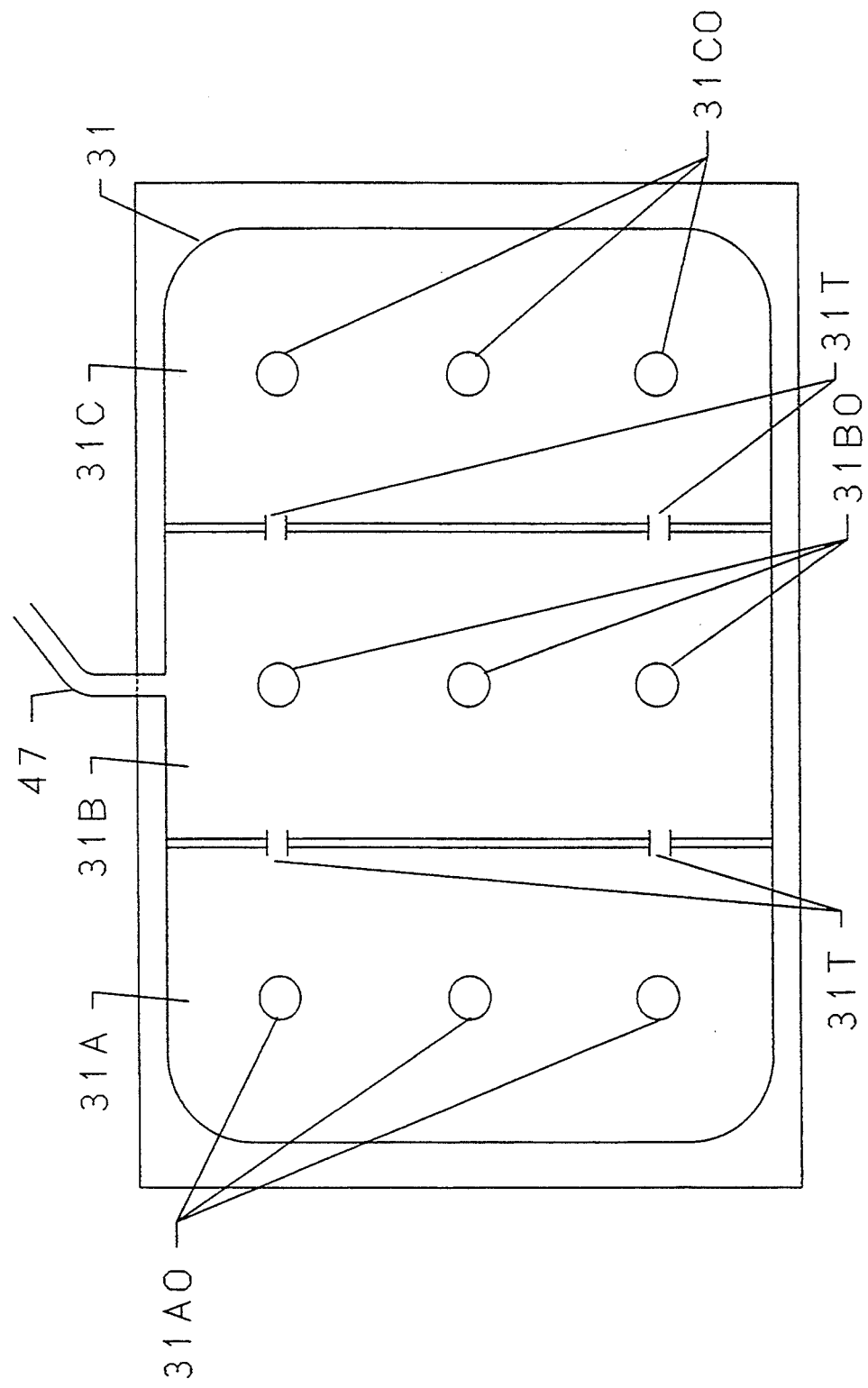
FIG. 5 is a cross-section of the cushion of FIG. 3 as seen along lines 5—5.

The inflatable cushion or bladder 31 of the invention is shown located in the bottom structural portion 23 of the seat although a similar cushion could be located in the back structural portion 25 of the seat. The cushion 31 may be generally square or rectangular as seen in FIG. 5.

FIG. 1B illustrates, in the isometric view, the general location of the rapid deflation device 201. Also shown is the branch 165 off a typical ejection seat's hot gas system 164 into the rapid deflation device actuation cylinder. Note that the remainder of the hot gas system continues unchanged to other seat components.

Figure 2:
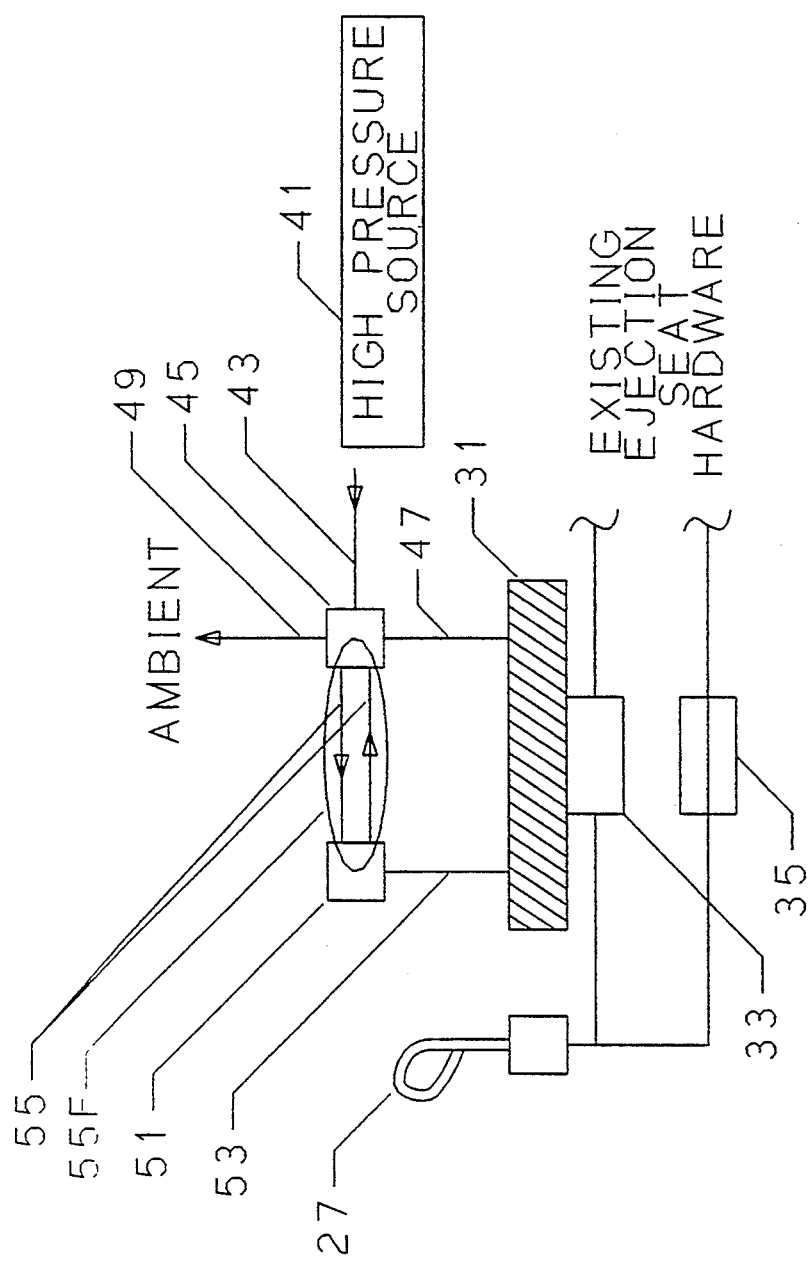
FIG. 2 is a schematic of the components of a system for sensing and varying the pressure in the cushion and for initiating ejection of the seat and rapid release of the gas pressure in the cushion.

Referring to FIG. 2, the cushion 31 is illustrated in block form. The ejection handle 27 is shown for actuating the cushion deflation system shown in block form at 33. Reference numeral 35 depicts the system for actuating the seat ejection system. Pulling of the handle 27 actuates the ejection system 35 (for ejecting the seat 21) and the cushion deflation system 33.

Also shown is a source of 41 of air or inert gas under pressure having an outlet 43 coupled to a valve 45 for allowing gas to flow into the cushion 31 by way of conduit 47 or to flow out of the cushion 31 by way of conduit 47, valve 45 and outlet 49. The conduit 47 may be coupled to the cushion 31 on one side as shown in FIG. 3, 5, 6, 8, 11, and 13.

A pressure sensor 51 is coupled to the cushion 31 by way of conduit 53 to monitor the pressure difference between ambient air pressure and the pressure in the cushion 31. Reference numeral 55 illustrates leads coupled between the sensor 51 and the valve 45. In FIG. 2, the power source for the valve 45 and sensor 51 is not illustrated.

During routine flight at or near one "g" acceleration in the local vertical direction, the inflation pressure of the cushion 31 will be maintained at some value corresponding to a predetermined pressure differential between the cushion and the local environment outside of the cushion. For example the differential pressure in the cushion 31 may be maintained at a value of 5 p.s.i. The sensor 51 monitors that pressure difference. When the sensor 51 detects too great a change in that pressure difference from its predetermined value, it causes operation of the valve 45 as follows. If the pressure differential varies to the high side of the preset value, the valve 45 will open to allow flow of gas pressure from the cushion 31 to outlet 49 by way of the conduit 47 and the valve 45. If the pressure differential varies to the low side, the valve 45 will open to allow gas pressure to flow into the cushion 31 from the source 41 by way of outlet 43, valve 45 and conduit 47.

During times of maneuvering flight, the specified pressure differential will be increased as a function of the magnitude of the acceleration being experienced. One purpose of the increase is to keep the seat occupant in the same location in his local environment as he is during unaccelerated flight. Another purpose is to keep the cushion from compressing to the point where the occupant feels, under pressure of his body, the hard surface of the seat. The amount and scheduling of that pressure increase may be determined by conventional engineering practice including but not limited to analysis, computer simulation, centrifuge, or flight test. The pressure sensor 51 will have circuitry, computing devices, mechanical devices or data monitoring capability that will allow it to control the pressure differential during all phases of flight. The circuit is represented by the control and feedback loop 55F.

There also may be a separate controller that takes precedence during times of accelerated flight.

A different mode of operation comes into effect when the ejection sequence is initiated. Pulling of the ejection handle 27 starts the sequence of events typical of present ejection seats. The cushion deflation system deflates the cushion 31 sufficiently prior to movement of the seat up the rails of the ejection system to prevent injury to the occupant. A typical ejection sequence demands that the cushion be fully deflated approximately 0.1 seconds after the event is initiated.

Figure 3:
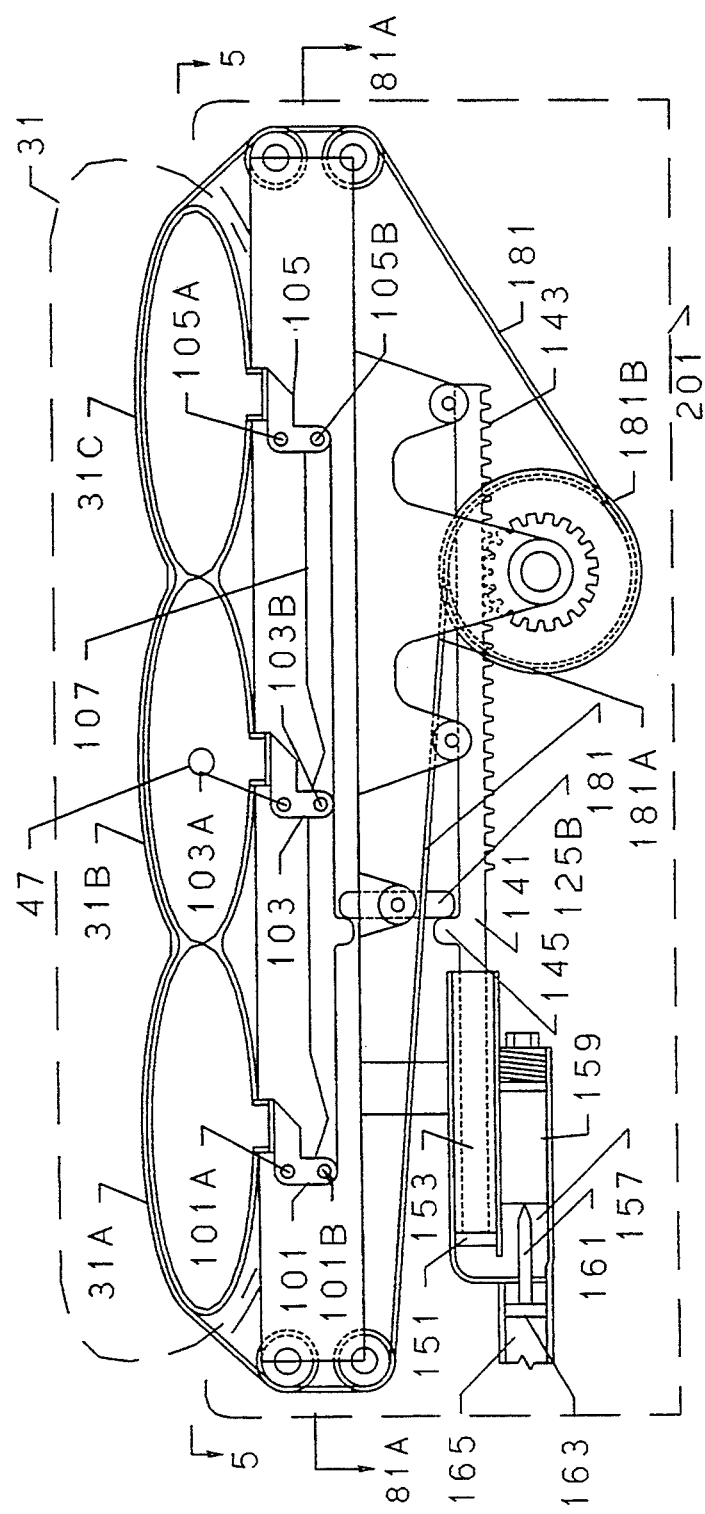
FIG. 3 is a cross-sectional view of the embodiment of the invention employing a release valve and mechanical means for causing rapid release of the pressure of the cushion.
Figure 4:
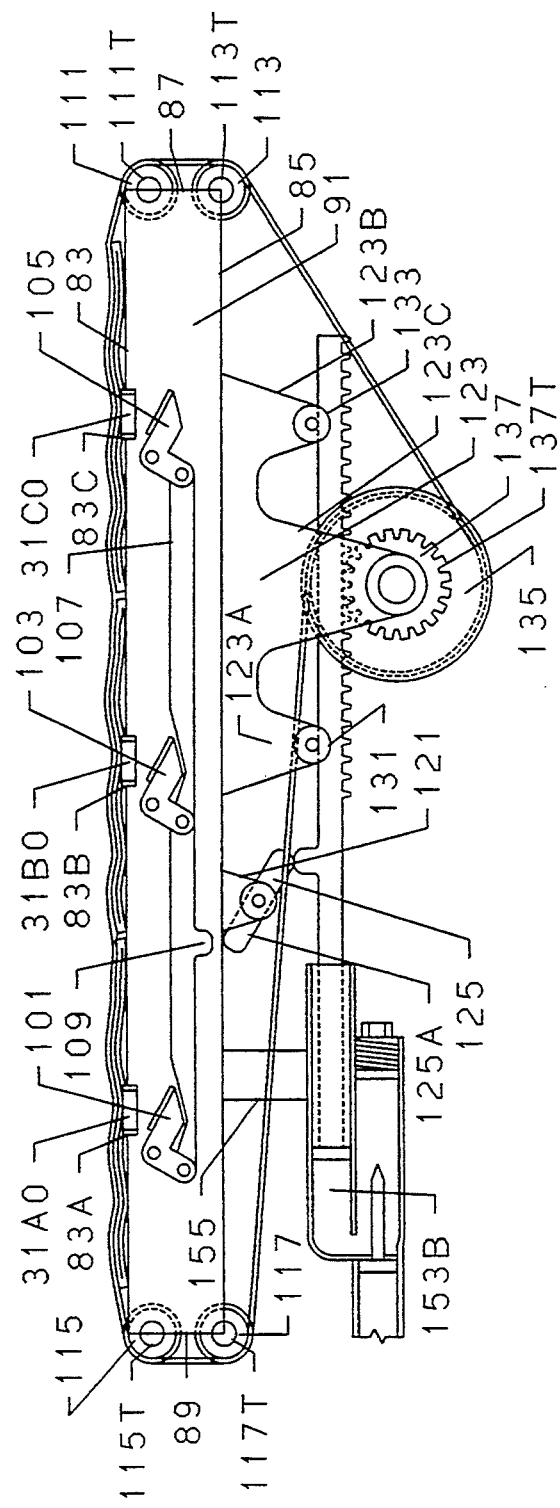
FIG. 4 illustrates the mechanism of FIG. 3 with the cushion in a deflated condition.

Referring now to FIGS. 3 and 4, the inflatable cushion 31 is formed of three separate bladders 31A, 31B, and 31B connected together and supported on a frame 81 which is formed of walls 83, 85, 87, and 89 with an opening 91 extending therethrough. The cushion 31 may generally rectangular or square as shown in FIG. 5. The interiors of the bladders 31A, 31B, and 31C are in fluid communication with each other by small tubular openings 31T. The frame 81 is part of the seat structure. The frame 81 is generally rectangular or square as seen in plane 81A—81A and conforms generally to the shape of the cushion 31 as shown in FIG. 5. The three bladders 31A, 31B, and 31C have three outlets 31AO, 31BO, and 31CO which extend through three openings 83A, 83B, and 83C of the wall 83. It is estimated that, in practice, the openings 31AO, 31BO, and 31CO should be about one inch in diameter. It is also estimated that between five and ten such openings are required to achieve the desired deflation rate. Nine such openings are shown in FIG. 5. Three valve numbers 101, 103, and 105 are employed to open and close the three outlets 31AO, 31BO, and 31CO respectively. The valve members 101, 103, and 105 are pivotally coupled to structure of the frame 81 by pins 101A, 103A, and 105A respectively. In addition valve members 101, 103, and 105 are pivotally coupled to a rod 107 by pins 101B, 103B, and 105B respectively. The rod 107 has a projection 109 extending therefrom.

Two reels 111 and 113 are rotatably coupled to tabs 111T and 113T which are connected to wall 87 and two reels 115 and 117 are rotatably coupled to tabs 115T and 117T which are connected to wall 89. Slots are provided in walls 83, 87, 85 and in walls 83, 89, and 85 to allow reels 111, 113 and 115, 117 to rotate.

Secured to the outside of wall 85 are brackets 121 and 123. Bracket 121 rotatably supports a lever 125. Bracket 123 has three projections 123A, 123B and 123C. Projections 123A and 123B support grooved rollers 131 and 133 for rotation. Projection 123C supports a grooved reel 135 and a gear 137 fixedly connected to reel 135 for rotation. A rack member 141 is provided having teeth 143 on one side which mesh with the teeth 137T of the gear 137. The other side of the rack 141 fits in the grooves of the rollers 131 and 133. A projection 145 extends from the other side of the rack 141 for engaging and tripping the lever 125 when the rack 141 is actuated.

The rear end of the rack 141 has a piston 151 which slides in a cylinder 153 which is fixedly connected to the wall 85 of the frame 81 by a bracket 155. The cylinder portion 153B behind the piston 151 is in fluid communication with a cylinder 157 in which is located a pyrotechnic cartridge 159 and a firing pin 161. The rear end of the pin 161 has a piston 163 which slides in a cylinder 165 which is coupled to the high pressure gas from the existing ejection seat initiation hardware.

A flexible strap 181 or webbing has one end 181A connected in the groove of the reel 135 from which it extends to and fits in the grooves of reels 117 and 115, around the inflated cushion 31; in the grooves of the reels 111 and 113; and then to the reel 135 where its other end 181B is connected in the groove of the reel 135.

In one embodiment the strap may be of moderate width, i.e. 4 inches, and only located at the back of the cushion. The placement is chosen to insure cushion deflation under the bony prominences of the typical pilot's posterior. Such a location would quickly get the pilot's skeletal structure in close contact with the seat base. Another embodiment may have a strap or straps pulling on a larger piece of material stretched over the entire cushion. Such a design would cause uniform deflation of the entire cushion.

In the inflated position of the cushion 131, the end 125A of the lever 125 engages the projection 109 of the rod 107 and the end 125B of the lever 125 engages the projection 141 and holds the valves 101, 103, and 105 in their closed positions closing the outlets 31AO, 31BO, and 31CO of the bladders 31A, 31B and 31C maintaining the bladders inflated.

When the handle 27 is pulled to actuate the ejection system, high pressure gas flows from the ejection system to cylinder 165 forcing the piston 163 and its pin 161 into the cartridge 159 causing the cartridge 159 to ignite. This creates very high pressure gas in the cylinder 157 which rapidly causes the piston 151 and hence the rack 141 to move to the right as shown in FIGS. 3 and 4, tripping the lever 125 and allowing the valves 101, 103, and 105 to open to release the gas from the bladders 31A, 31B and 31C for flow out of the opening 91. At the same time, the reel 135 is rotated clockwise as shown in FIGS. 3 and 4 causing the strap 181 to be wound around the reel 135 thereby compressing the bladders 31A, 31B, and 31C to enhance rapid deflation.

Dotted line 201 represents an enclosure that will enclose the apparatus of FIGS. 3, 4 and 5. Slots will be employed in the enclosure to allow free passage of the strap 181.

Although not shown in FIGS. 3, 4 and 5, the other components of FIG. 2 including source 41, valve 45 and sensor 51 are all employed in the system of FIGS. 3, 4 and 5 in the same manner as described and shown in connection with FIG. 2.

Referring now to the embodiments of FIGS. 6–14 the reels 111, 113, 115, 117, the strap 181, the rack 141 and gear 137 and components 153, 157, 159, 161, and 163 are not employed. In the embodiments of FIGS. 6–14, reference numerals that are the same as those of FIGS. 1–6 identify the same components. The system of FIGS. 2 will be used in the embodiments of FIGS. 6–14.

Figure 6:
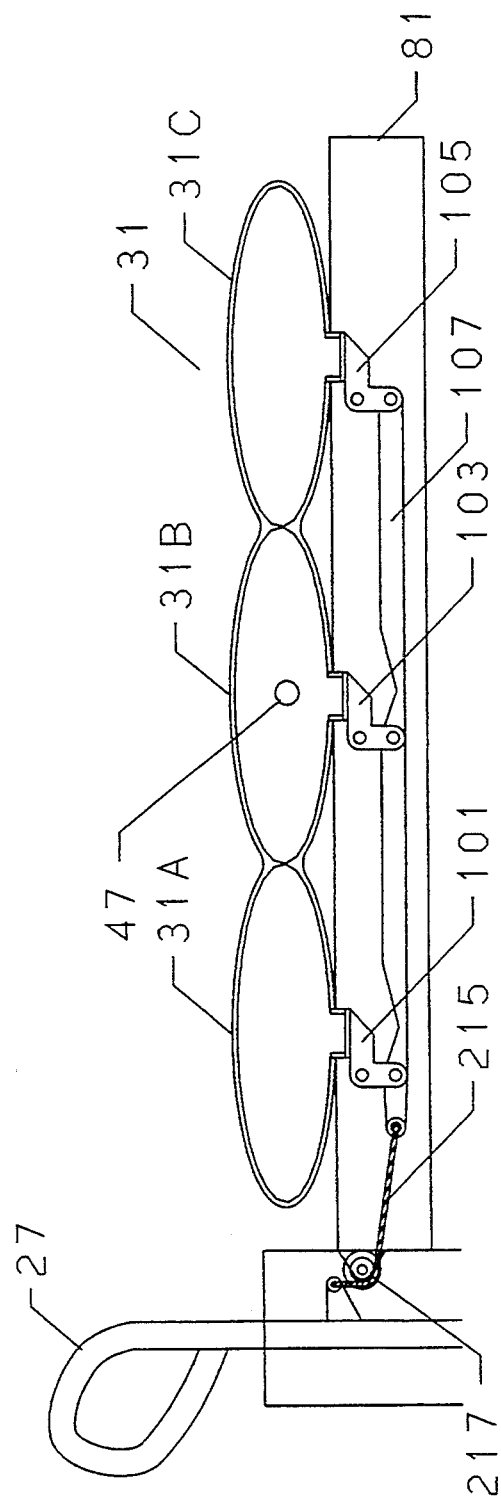
FIG. 6 and 7 are a modified system of FIGS. 3 and 4 for mechanically opening the valves to allow cushion deflation.
Figure 7:
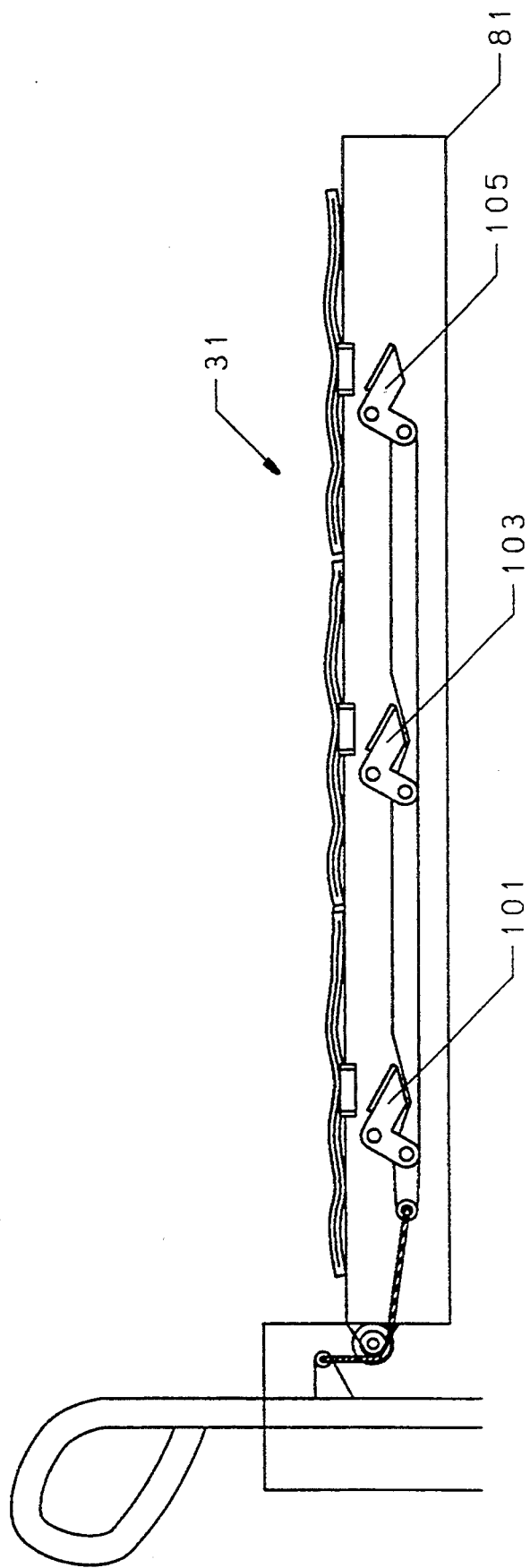

Referring first to the embodiment of FIGS. 6 and 7 a cord 215 is attached to the rod 107 and to the handle 27 and extends around a rotatable reel 217. When the handle 27 is pulled, the rod 107 is pulled to the left as shown in FIGS. 6 and 7 moving the valves 101, 103, and 105 to open positions to allow the compressed gas to flow out of openings 31AO, 31BO, and 31CO to deflate the bladders 31A, 31B, and 31C of the cushion 31.

Figure 10:
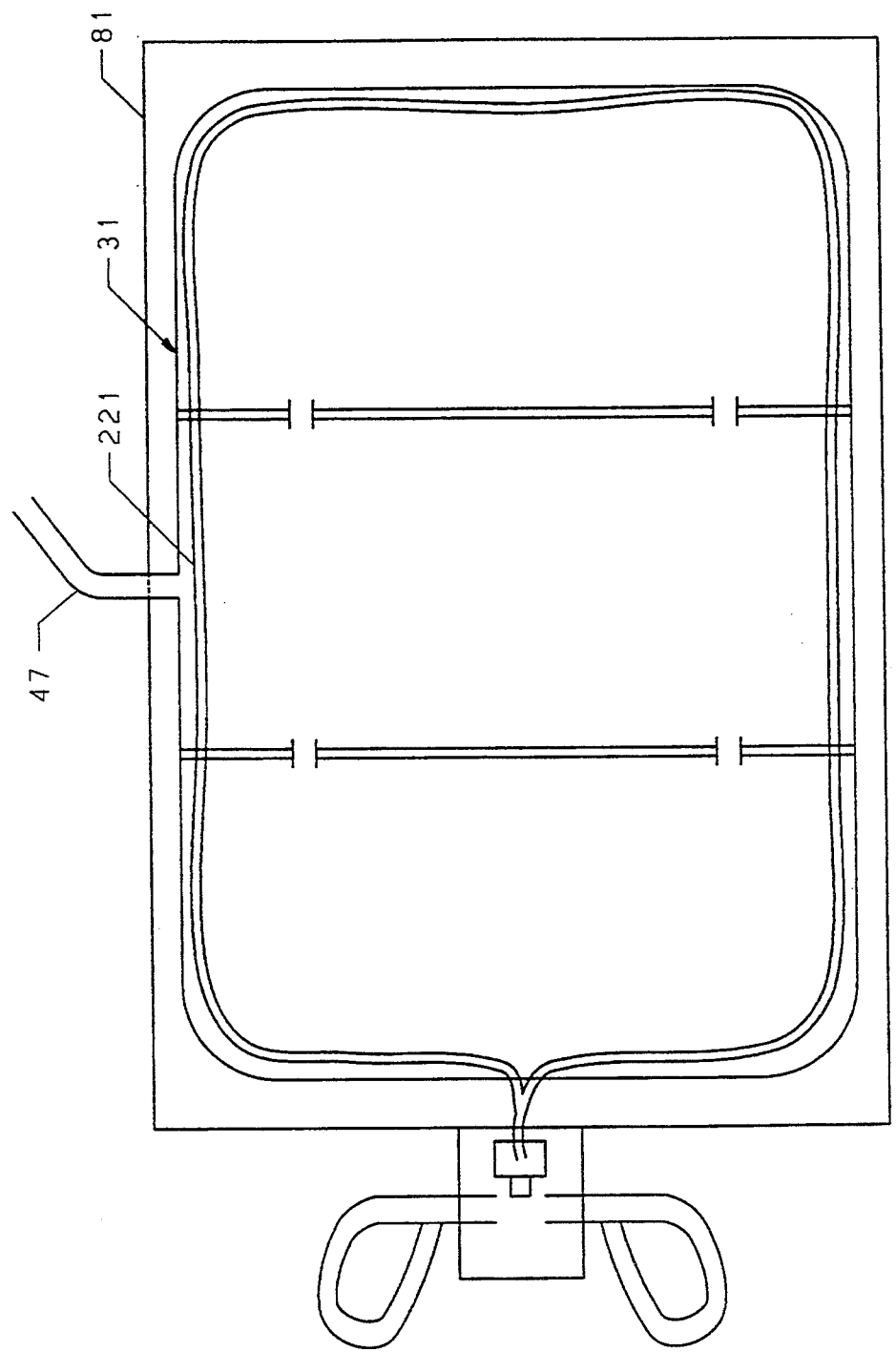

Referring to FIGS. 8–10, member 221 is an explosive primer cord coupled to a detonating device 223. The cord 221 extends through the bladders 31A, 31B, and 31C of the cushion 31. When the handle 27 is pulled, the device 223 actuates the primer cord 221 which ruptures the cushion 31, instantly releasing the compressed gas therein.

Figure 11:
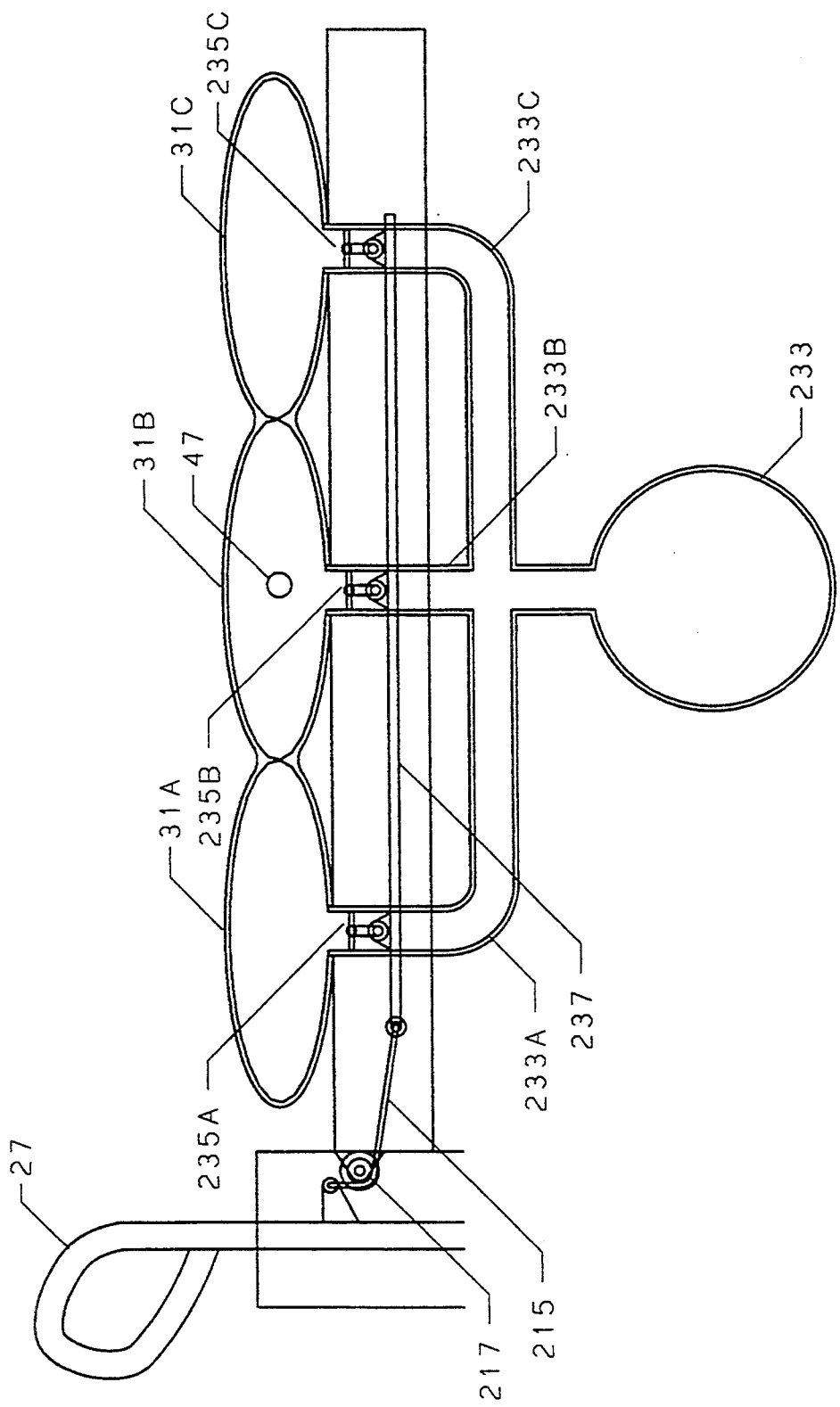
FIG. 11 and 12 illustrate mechanically opened valves that vent the cushion air to a vacuum container to speed deflation.
Figure 12:
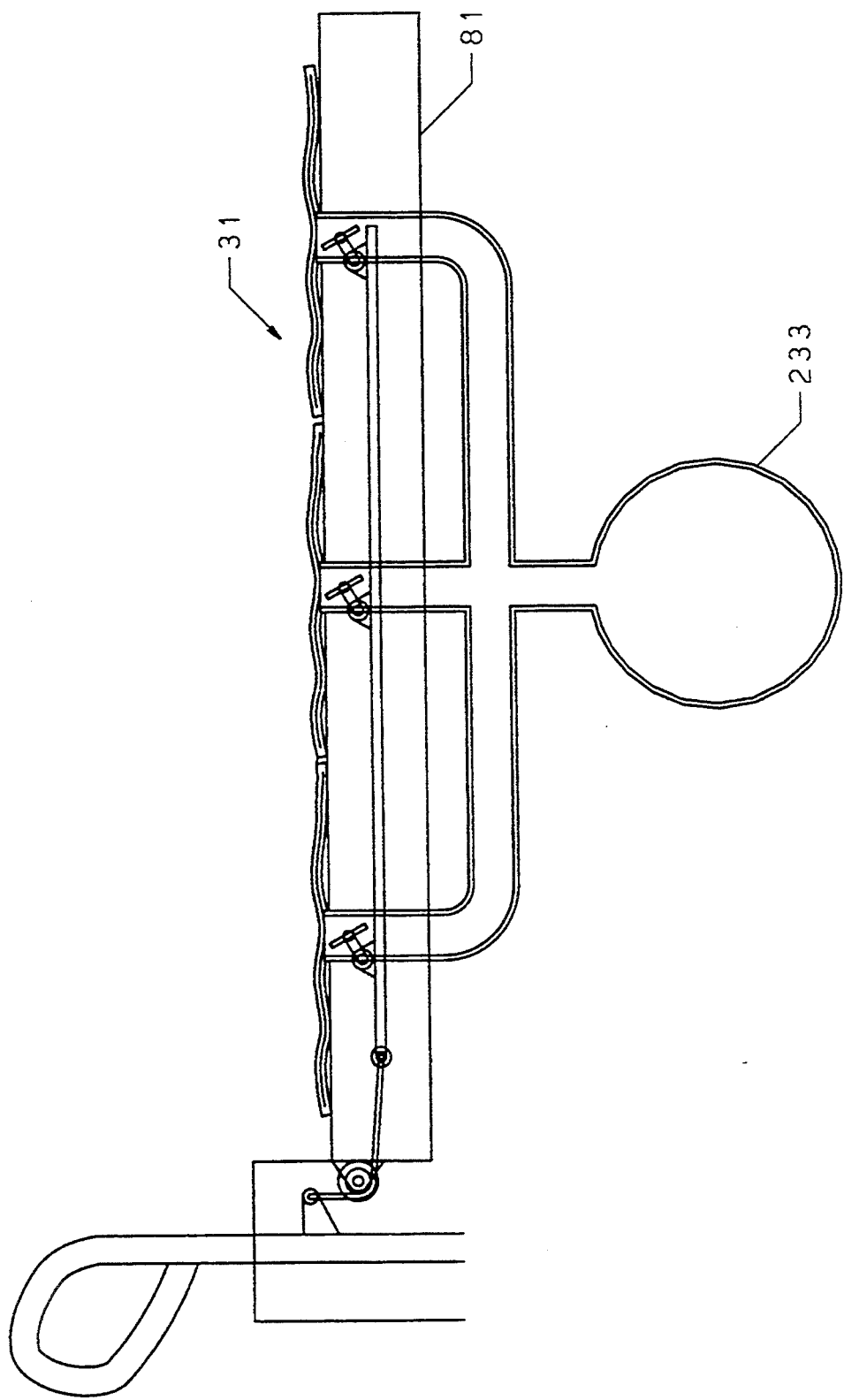

Referring to FIGS. 11 and 12 member 233 is a vacuum container coupled to outlets 31AO, 31BO, and 31CO by way of conduits 233A, 233B, and 233C. Valves 235A, 235B, and 235C are located in conduits 233A, 233B, and 233C respectively and are held in closed positions by a rod 237 which extends through the three conduits 233A, 233B, and 233C. Cord 215 is attached to the rod 237 and to the handle 27 and extends around a rotatable reel 217. When the handle 27 is pulled, the rod 237 is moved to open the valves 235A, 235B, and 235C to release the pressurized gas from the cushion 31 into the conduits 233A, 233B, and 233C. The vacuum of the container 233 speeds deflation of the cushion 31.

Figure 13:
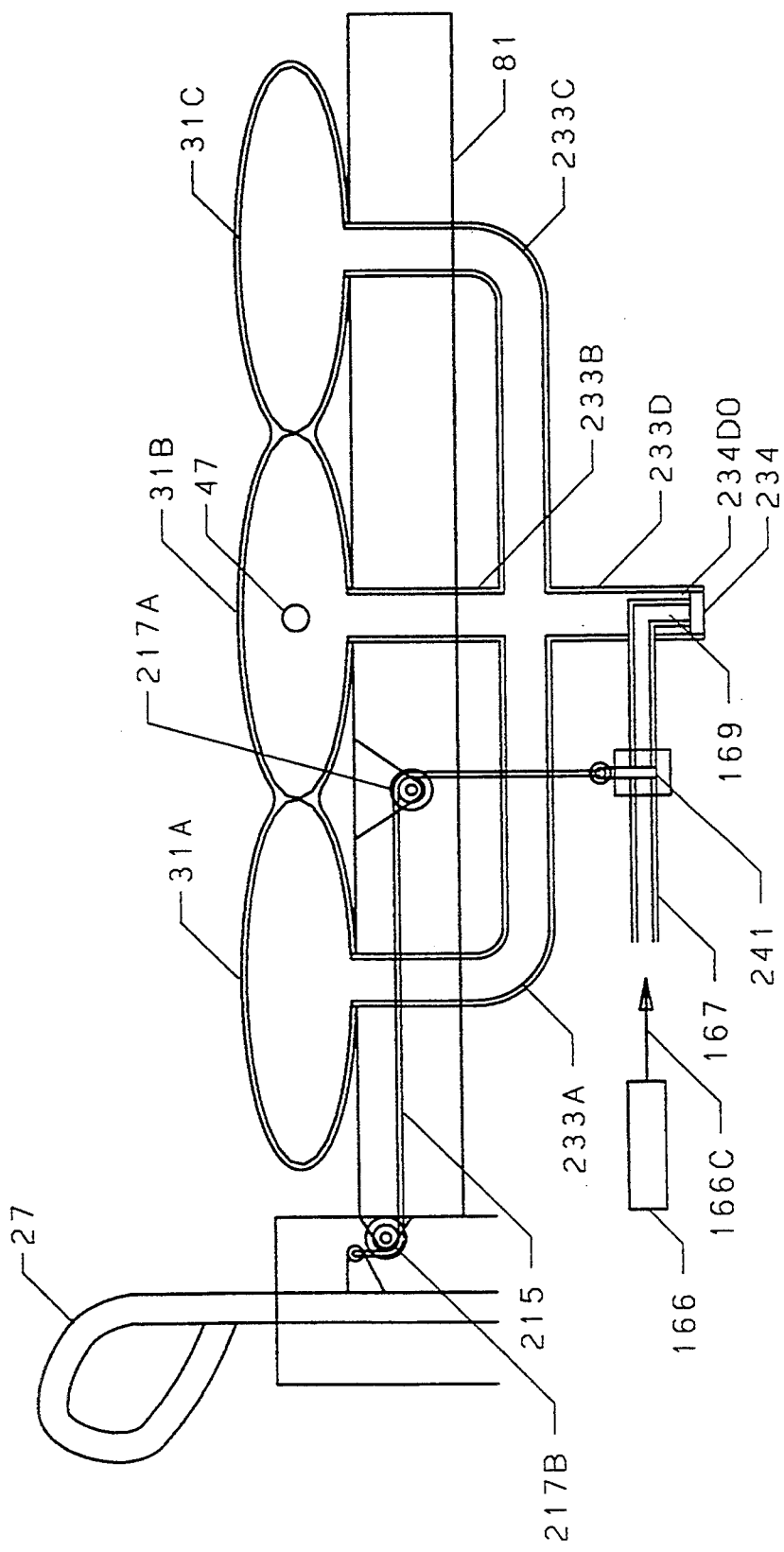
FIG. 13 and 14 illustrate an ejector arrangement to speed deflation of the cushion.
Figure 14:
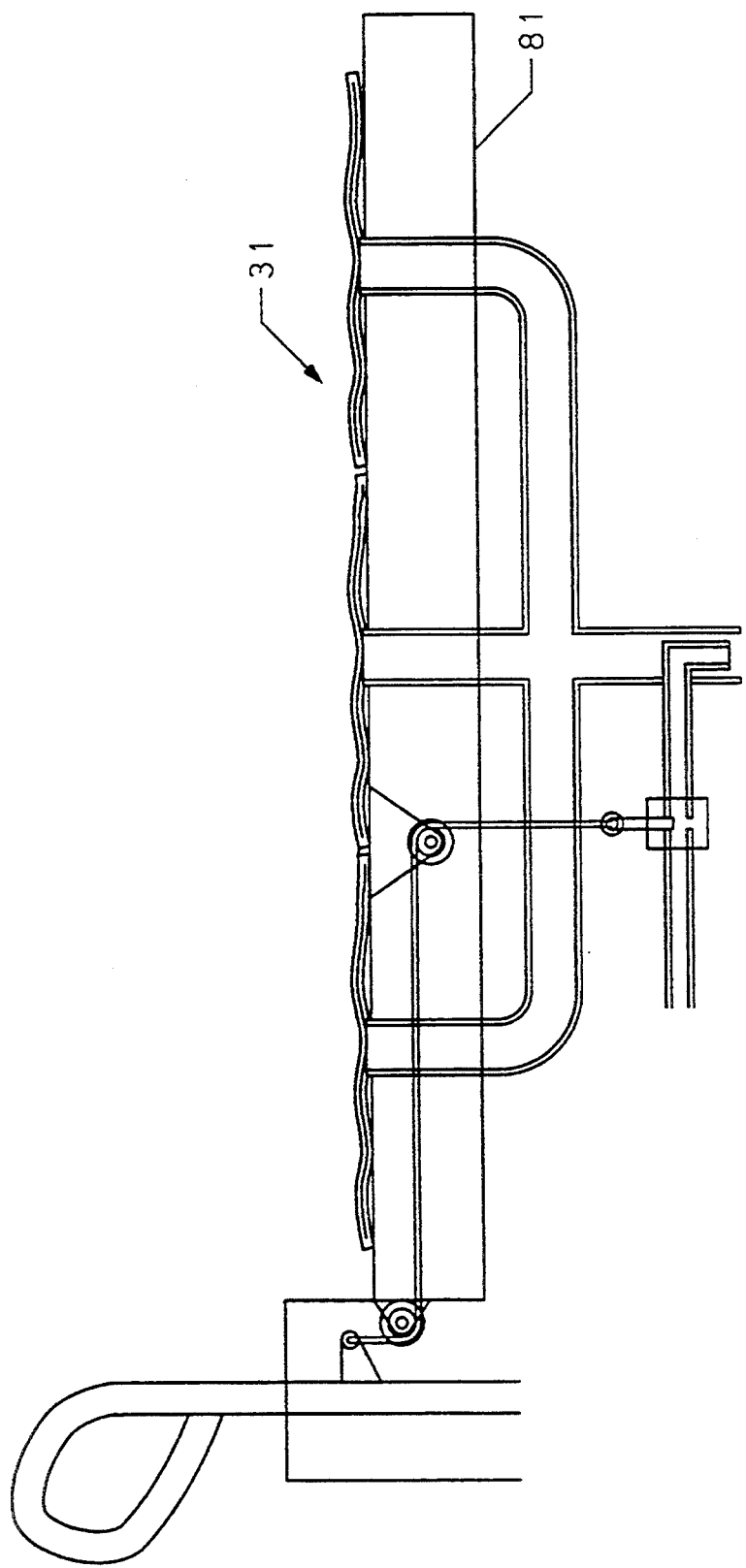

Referring to FIGS. 13 and 14, the three conduits 233A, 233B, and 233C are coupled to the outlets of the three bladders 31A, 31B, and 31C and to a common conduit 233D which has a friction fit valve 234 located in outlet end 233DO. The low pressure in the cushion, i.e. less than 5 p.s.i. cannot dislodge the valve 234. A high pressure gas source 166 has a conduit 166C coupled to a conduit 167 which in turn is coupled to a nozzle 169 located in the conduit 233D whose outlet is directed toward the outlet of the conduit 233D. A valve 241 normally closes the conduit 167. A cord 215 is coupled to the valve 241 and to the handle 27 and extends around rotatable reels 217A and 217B. When the handle 27 is pulled, the cord 215 opens the valve 241 and allows the pressurized gas from source 166 to flow through the nozzle 169 to blow the valve 234 out of the outlet 233DO. The high pressure gas flowing from the nozzle 169 increases the rate at which the cushion 31 is deflated. In the embodiment the relative pressure from source 166 may be i.e. 20 p.s.i. much higher than the pressure within the cushion 31.

What is claimed is:

1. A seat for supporting a person in an aircraft, said seat being of the type adapted to be ejected from the aircraft comprising:
   seat structure for supporting a person,
   an inflatable cushion coupled to said seat structure in a position for bearing at least a part of the force exerted by the person when supported by said seat structure,
   a source of gas under pressure for inflating said cushion,
   control means including pressure sensing means and valve means coupled to said cushion and to said source for maintaining the pressure of the gas in said cushion generally at a given level, pressure release means independent of said control means for rapidly deflating said cushion to allow the force exerted by the person supported by said seat structure, when high acceleration forces are encountered upon ejection of the seat structure, to be born primarily by said seat structure.

2. A seat for supporting a person in a vehicle subject to high acceleration forces, comprising:

seat structure for supporting a person, an inflatable cushion coupled to said seat structure in a position for beating at least a part of the force exerted by the person when supported by said seat structure, a source of gas under pressure for inflating said cushion, control means including pressure sensing means and valve means coupled to said cushion and to said source for maintaining the pressure of the gas in said cushion generally at a given level, and pressure release means independent of said control means for rapidly deflating said cushion to allow the force exerted by the person supported by said seat structure, when high acceleration forces are encountered, to be born primarily by said seat structure, said pressure release means comprises:

at least one outlet coupled to said cushion, a pressure release valve coupled to said outlet for releasing the gas pressure in said cushion when opened, and a manually actuated apparatus for opening said pressure release valve.

3. The seat of claim 2 comprising mechanical compression means for compressing said cushion when said pressure release valve is opened, and means for actuating said mechanical compression means when said pressure release valve is opened for compressing said cushion for increasing the rate at which the gas pressure in said cushion is released.

4. The seat of claim 3 wherein said mechanical compression means comprises a flexible strap coupled to one side of said cushion and to said seat and actuating means for forcing said strap against said one side of said cushion when said pressure release valve is opened for increasing the rate at which the gas pressure in said cushion is released.

5. The seat of claim 2, comprising:

a container coupled to said release valve and having a pressure lower than that of said cushion for increasing the rate at which the gas pressure is released from said cushion when said release valve is opened.

6. A seat for supporting a person in a vehicle subject to high acceleration forces, comprising:

seat structure for supporting a person, an inflatable cushion coupled to said seat structure in a position for bearing at least a part of the force exerted by the person when supported by said seat structure, a source of gas under pressure for inflating said cushion, control means including pressure sensing means and valve means coupled to said cushion and to said source for maintaining the pressure of the gas in said cushion generally at a given level, and pressure release means independent of said control means for rapidly deflating said cushion to allow the force exerted by the person supported by said seat structure, when high acceleration forces are encountered, to be born primarily by said seat structure, said pressure release means comprises explosive means coupled to said cushion for severing said cushion when said explosive means is exploded, and means for exploding said explosive means.

7. A seat for supporting a person in a vehicle subject to high acceleration forces, comprising:

seat structure for supporting a person, an inflatable cushion coupled to said seat structure in a position for beating at least a part of the force exerted by the person when supported by said seat structure, a source of gas under pressure for inflating said cushion.

control means including pressure sensing means and valve means coupled to said cushion and to said source for maintaining the pressure of the gas in said cushion generally at a given level, and pressure release means independent of said control means for rapidly deflating said cushion to allow the force exerted by the person supported by said seat structure, when high acceleration forces are encountered, to be born primarily by said seat structure, said pressure release means comprises:

at least one outlet coupled to said cushion, an outlet valve for normally closing said outlet, said outlet valve being adapted to be actuated for opening said outlet, a source of high gas pressure, a nozzle coupled to said source by way of a conduit and to said outlet for flowing high pressure gas from said source of high gas pressure out of said outlet when said outlet is open, a normally closed control valve coupled to said conduit, a manually actuated apparatus for opening said control valve for releasing the high gas pressure from said source of high gas pressure for flow to said nozzle and out of said outlet when said outlet is open for increasing the rate at which the gas pressure in said cushion is released.

* * * * *